Patented Mar. 4, 1941

2,233,891

UNITED STATES PATENT OFFICE 2,233,891

PLASTICIZED PROTEIN COMPOSITIONS

Edouard M. Kratz, Ogden Dunes, Ind., assignor to Marbon Corporation, a corporation of Delaware No Drawing. Application May 10, 1935, Serial No. 20,728. Renewed February 23, 1940

10 Claims. (Cl. 106—38)

The invention relates to plasticized protein compositions, and more particularly to compositions containing casein and organic acids. It includes products made from the composition such as molded masses, sheets, and coated material. The preferred product is a transparent wrapping sheet.

It is an object of the present invention to produce improved plasticized protein compositions. It is a further object of the invention to make a clear, strong, transparent wrapping sheet.

Another object is to produce a permanently flexible protein wrapping sheet which remains flexible independently of weather conditions.

Other objects will become apparent from the specification.

In the present invention an organic acid is incorporated with a protein. The organic acids which have been found to give good results with casein (the preferred protein) are in general those which do not have dissociation constants so high that they cause precipitation of the casein, which are liquid or soft solids at room temperature, and which are high boiling enough to remain in the composition an extended period of time and which have little or no odor.

The casein is preferably a purified casein or a highly washed casein but any commercial casein is operable. In order to obtain the casein in an aqueous solution it is necessary to use a caustic alkali to form the water soluble caseinate. Various caustic alkalis such as sodium and potassium hydroxides, ammonia hydroxide and various organic bases, such as the alkylamines and hydroxyalkylamines are suitable for this purpose. Of the organic bases there may be used amylamine, ethylene diamine, triethanolamine.

The neutralization of the casein is carried out by the addition of the basic material dissolved in water to the casein in such quantity as to obtain a pH value of the resulting solution of about 5.9 at which point the casein will be in solution as a soluble caseinate. The casein may be made to dissolve at a pH value above 5.8 as for example 6.8, but for the obtaining of improved wet strength casein sheets a pH as low as possible is preferred.

For the practical purposes the lower pH limit may be taken at about 5.8 and the upper limit at 7.5.

The casein may be soaked in water and a base added to it but for the obtaining of casein solutions of low pH such as 5.8, an aqueous solution of a base is mixed with the casein. The amount of potassium hydroxide required to obtain a casein solution having a pH value of 5.8 will vary between about 2 to 4 parts by weight per 100 parts of casein. The exact amount of caustic may be predetermined. The concentration of the caustic solution may vary, but a proportion of 500 parts of water with the caustic per 100 parts of casein gives satisfactory results.

The temperature of the casein solution is preferably raised to about 140° F. It may vary widely and where good clarity is not an important factor the solution may be cold.

The organic acid is then added to the casein solution. It is mixed with an emulsifying agent, preferably along with glycerol or a polyglycerol. The mixture heated to about 210 to 212° F. is added to the hot casein solution.

The preferred emulsifying agent is a mixture of alkali metal salts of organic sulfonic acids.

A suitable mixture of sulfonates is known to the trade as "Soap H." It comprises certain purified and neutralized hydrocarbon sulfonic acids obtained as a by-product in the manufacture of the so-called "white" oils. In such manufacture, a lubricant fraction of the oil is treated with fuming sulfuric acid. Some of the resulting sulfonic acids are soluble in the oil and others separate as a black sludge with the excess acid. The oil portion is neutralized with caustic soda and extracted with 50% alcohol. The extracted material, consisting mostly of the sodium sulfonate of the hydrocarbons, after further alcoholic purification to eliminate the oil and sodium sulfate, is known as Soap H and is both oil and water soluble and mixes well with the organic acids used. Its function in the composition is to act as an emulsifying agent and it may be replaced by other suitable emulsifying agents, if desired, such as the triethanolamine sulfonate of hydrocarbons of the Soap H type, or by triethanolamine oleate.

It is preferred to use about one part emulsifying agent to one part of organic acid. Cyclohexanol may be added to the solution when "Soap H" is used since cyclohexanol has the property of assisting dispersions made with Soap H. In place of cyclohexanol other dispersing assistants such as methyl alcohol may be used.

The following example is given as an illustration of suitable proportions but the invention should not be construed as limited to the proportions and specific ingredients, since other substances may be substituted as explained above, and the proportions may be varied within considerable limits:

|  | Preferred | Broader range |
|---|---|---|
|  | Parts by weight | Parts by weight |
| Protein: Casein | 100 | 100 |
| Basic substance: Potassium hydroxide | 2.2 | 2 to 4 |
| Plasticizers: |  |  |
| Oleic acid | 30 | 10 to 60 |
| Glycerine | 6 | 0 to 20 |
| Emulsifying agent: |  |  |
| Soap H | 20 | 0 to 60 |
| Cyclohexanol | 6 | 0 to 20 |

In place of oleaic acid there may be substituted with similar results n-caprylic acid, n-capric acid, olive oil fatty acid, coconut oil fatty acid, coin oil fatty acid, linseed oil fatty acid, hardened coconut oil fatty acid, peanut oil fatty acid, soya bean oil fatty acid, rape seed oil fatty acid and naphthenic acid. Erucic acid gives flexible sheets but the sheets are not as clear as with the other acids probably due to the fact that erucic acid is of higher melting point than the other acids. In general the solid organic acids of melting point above 40° C. are not preferred for the production of flexible transparent wrapping sheets, although for some purposes, such as molding, the incorporation of high melting organic acids with casein and particularly high melting fatty acids such as lauric, myristic, palmitic and stearic is of value.

In a casting a composition such as described into sheets or films, a suitable insolubilizing agent, such as an aldehyde or the like is added. The effect of such an agent is to render the caseinate insoluble in water and to strengthen the film greatly. For this purpose we prefer to use a 6% solution of formaldehyde in water. A stronger solution will tend to cause precipitation of the casein at the time the solutions are mixed. Our preferred proportion for these solutions is about one part of 6% formaldehyde solution to 25 parts by volume of the casein solution. Since this is more than sufficient formaldehyde to give the maximum insolubilizing action, lesser quantities of formaldehyde may therefore be used. The two solutions should be thoroughly mixed just before use and then promptly cast in continuous films or formed into sheets, since the mixture sets in a few minutes.

It is preferable to mix the solutions continuously in small quantities and immediately and continuously flow the mixture onto a suitable forming belt. A belt having a coating of cellulose nitrate will be satisfactory for this purpose. A suitable machine for use in forming this composition into sheets is described in the copending application of Edouard M. Kratz and Herman Heckel, Serial No. 630,406, filed August 26, 1932, now Patent No. 2,014,937.

After being cast onto the forming or carrier belt, the film on the belt is subjected to a drying operation by passing the belt through heated drier chambers, under controlled temperature and humidity conditions. The film is thereby dried and is then stripped from the carrier belt and wound into a roll in a continuous operation.

It is to be understood that various details of the procedure and materials may be varied without departing from the spirit of the invention. Although casein is the preferred protein for the production of permanently flexible clear transparent wrapping sheets, other proteins are operable. Gelatine, zein, gliadin and other proteins may be dissolved in their usual solvents and organic acids incorporated with the solution by means of emulsifying agents where such are necessary. By casting the solution on a forming surface thin sheets or films are obtained.

The use of volatile bases such as ammonium hydroxide to dissolve the casein results in a caseinate which may partially or completely dissociate into casein and ammonia on heating and drying of the sheets made from the caseinate. The term "caseinate derivative" is to be understood as to include such partially or completely dissociated caseinates.

I claim:

1. A liquid composition comprising an aqueous dispersion of casein in the form of its caseinate, and a fatty acid, the caseinate being present as the major dispersed ingredient of the composition.

2. A liquid composition which on drying forms a tough flexible transparent film of high wet strength composed mainly of casein, said composition comprising an aqueous dispersion essentially comprising water, casein in the form of its caseinate, and a fatty acid, said fatty acid being present in a range of from approximately 10 to 60 parts by weight per 100 parts by weight of casein, and being uniformly dispersed in the water, said casein being present as a major dispersed ingredient.

3. A liquid composition which on drying forms a tough, flexible, transparent film of high wet strength, composed mainly of casein, said composition comprising an aqueous dispersion consisting of water, casein in the form of its caseinate, a fatty acid, a water soluble plasticizer, and an emulsifying agent, the casein being present as the major dispersed ingredient.

4. A liquid composition which on drying forms a tough, flexible, transparent film of high wet strength, said composition comprising an aqueous dispersion of water, casein in the form of its caseinate as a major dispersed ingredient, oleic acid, glycerine, and an alkali metal salt of an organic sulphonic acid.

5. A thin flexible transparent film of high wet strength, and suitable for wrapping purposes, said film being composed mainly of casein and having incorporated therein a minor proportion of a fatty acid.

6. A liquid composition comprising an aqueous dispersion of casein in the form of its caseinate, a fatty acid and a water soluble plasticizer for said caseinate, the caseinate being present as the major dispersed ingredient.

7. A liquid composition comprising an aqueous dispersion of casein in the form of its caseinate, a fatty acid, and an emulsifying agent, the caseinate being present as the major dispersed ingredient.

8. The method of producing flexible articles such as films and the like of high wet strength composed mainly of casein or its derivatives, which comprises dissolving casein in an aqueous medium by means of a basic substance, and adding thereto a fatty acid.

9. The method of producing flexible articles such as films and the like of high wet strength composed mainly of casein or its derivatives, which comprises dissolving casein by means of a basic compound in an aqueous medium at a pH of between approximately 5.8 and 7.5, and adding thereto a fatty acid.

10. The method of producing flexible films and the like of high wet strength composed mainly of casein or its derivatives, which comprises adding an aqueous alkaline solution to casein in amount sufficient to give a solution of caseinate of a pH of between 5.8 and 7.5; and mixing therewith a fatty acid and a sulfonated type dispersing agent.

EDOUARD M. KRATZ.